(12) United States Patent
Thiry et al.

(10) Patent No.: US 12,359,736 B2
(45) Date of Patent: Jul. 15, 2025

(54) PRESSURE-RELIEF VALVE FOR A WATCH

(71) Applicant: MECO SA, Grenchen (CH)

(72) Inventors: Rémy Thiry, Les Bréseux (FR);
Samuel Geiser, Bienne (CH); Hervé Avril, Grenchen (CH)

(73) Assignee: MECO SA, Grenchen (CH)

( * ) Notice: Subject to any disclaimer, the term of this patent is extended or adjusted under 35 U.S.C. 154(b) by 413 days.

(21) Appl. No.: 17/974,010

(22) Filed: Oct. 26, 2022

(65) Prior Publication Data

US 2023/0213104 A1 Jul. 6, 2023

(30) Foreign Application Priority Data

Dec. 30, 2021 (EP) .................................... 21218283

(51) Int. Cl.
*F16K 17/04* (2006.01)
*G04B 37/10* (2006.01)

(52) U.S. Cl.
CPC .............. *F16K 17/04* (2013.01); *G04B 37/10* (2013.01)

(58) Field of Classification Search
CPC .... F16K 17/04; F16K 17/0486; F16K 17/164; F16K 27/02; F16K 27/08; G04B 37/10; G04B 37/02; G04B 37/08; G04B 37/103; G04B 37/0008
See application file for complete search history.

(56) References Cited

U.S. PATENT DOCUMENTS

| 5,257,247 A * | 10/1993 | Miche ..................... G04B 37/08 368/290 |
| 10,838,365 B2 * | 11/2020 | Podvin .................. G04B 37/103 |
| 2019/0137936 A1 | 5/2019 | Podvin et al. |
| 2021/0382438 A1 | 12/2021 | Furusato |
| 2021/0389729 A1 | 12/2021 | Vuille et al. |

FOREIGN PATENT DOCUMENTS

| EP | 1 586 960 A1 | 10/2005 |
| EP | 3 428 740 A1 | 1/2019 |
| EP | 3 483 669 A1 | 5/2019 |
| EP | 2 915 012 B1 | 3/2021 |
| JP | 2006-112832 A | 4/2006 |
| JP | 2019-86515 A | 6/2019 |
| JP | 2021-196356 A | 12/2021 |

OTHER PUBLICATIONS

European Search Report of EP 21 21 8283 dated Jun. 9, 2022.

* cited by examiner

*Primary Examiner* — Edwin A. Leon
(74) *Attorney, Agent, or Firm* — Sughrue Mion, PLLC

(57) ABSTRACT

A pressure-relief valve (1) including: a tube (2) intended to be fastened to a watch case, a recessed head (3) mounted movable in rotation and in translation about and along the axis of the tube (2), the head (3) being able to adopt a first axial position where a gas flow could be performed between the inside and the outside of the watch case and a second axial position where this gas flow is prevented, a first insert (4) mounted within the recess of the head (3), the valve (1) being wherein the head (3) is mounted on the tube (2) via the first insert (4) and wherein the head (3) is fastened to said first insert (4) by a screw thread and/or a glue.

20 Claims, 3 Drawing Sheets

PRESSURE-RELIEF VALVE FOR A WATCH

CROSS REFERENCE TO RELATED APPLICATIONS

This application claims priority to European Patent Application No. 21218283.6, filed on Dec. 30, 2021, the entire contents of which are incorporated herein by reference.

TECHNICAL FIELD OF THE INVENTION

The present invention relates to a pressure-relief valve for a watch case equipping a watch intended for scuba diving. The present invention also relates to the watch provided with said valve.

TECHNOLOGICAL BACKGROUND

Helium valves are present in some diving watches to evacuate helium having infiltrated into the watch case during so-called saturation diving where the divers breathe a gaseous mixture containing helium and oxygen. This enables them to remain several days inside a submarine bell or station. During this period of time, helium could infiltrate into the watch. In the absence of such a valve, the internal overpressure generated by the infiltrated helium could during the decompression phase cause damage to the watch, such as the loss of the crystal which is detached or breaks.

In the prior art, manual helium valves which operate simply by tightening/untightening a sealing element such as a valve head, like a crown screwed on a tube fitted or screwed onto the middle, are known. Conventionally, such valves comprise a plunger connected to the valve head which is able to exert a pressure on a sealing gasket by cooperating with a spring in order to regulate the pressure inside the watch case. Such a valve includes a recessed head screwed onto the tube and at least one gasket ensuring water-tightness of the valve while enabling, when it is not compressed, the passage of the gas between the inside and the outside of the watch case in case of overpressure.

In general, the head is further secured to different parts such as rings, spacers, members for controlling the stroke of the valve head, etc., having to be assembled by fitting or welding on the head for ease of mounting reasons. This assembly by welding or fitting limits the choice of materials and typically excludes hard materials such as ceramic from the boundaries of what is possible.

Henceforth, it is necessary to develop new valves with arrangements of parts within the valve enabling the use of these materials hard to deform and/or to weld in the watch-making field.

SUMMARY OF THE INVENTION

An object of the invention is to develop a new valve with an arrangement of parts requiring no assembly by fitting or welding of the head with another part in order to be able to make the valve head of a hard material such as ceramic, sapphire, ceramels, etc.

For this purpose, the assembly between the head and the tube or in general between the head and any part is performed via an insert secured to the head. Said insert not being visible from outside the valve, it may be made of a material that is less hard enabling any assembly type. According to the invention, fastening between the material of the head and the material of the insert is achieved by screwing, preferably by screwing and gluing, and alternatively by simple gluing, the screw thread being obtainable for example directly by moulding the head with the desired shape. Afterwards, the insert secured to the head may be fastened on any part including the tube by fitting or welding as well as by screwing depending on the required mounting conditions.

More specifically, the invention relates to a pressure-relief valve for a watch case comprising:
a tube intended to be fastened to said watch case, said tube defining an axis A designating an axial direction,
a head mounted movable in rotation and in translation about and along said axis A, said head being able to adopt a first axial position, called open position, where a gas flow could be performed between the inside and the outside of the watch case and a second axial position, called closed position, where the gas flow between the inside and the outside of the watch case is prevented, said head being provided with a cover, called first cover, and with an axial skirt, called first axial skirt, delimiting a recess, called first recess, within the head,
a first insert mounted within said first recess of the head, said valve being characterised in that the head is mounted on the tube via the first insert and in that the head is fastened to said first insert by fastening means comprising a screw thread and/or a glue.

BRIEF DESCRIPTION OF THE FIGURES

Other features and advantages of the present invention will appear upon reading the embodiments of the invention provided only as a non-limiting example and described with reference to the appended drawings wherein.

DETAILED DESCRIPTION OF THE INVENTION

Figure 1:
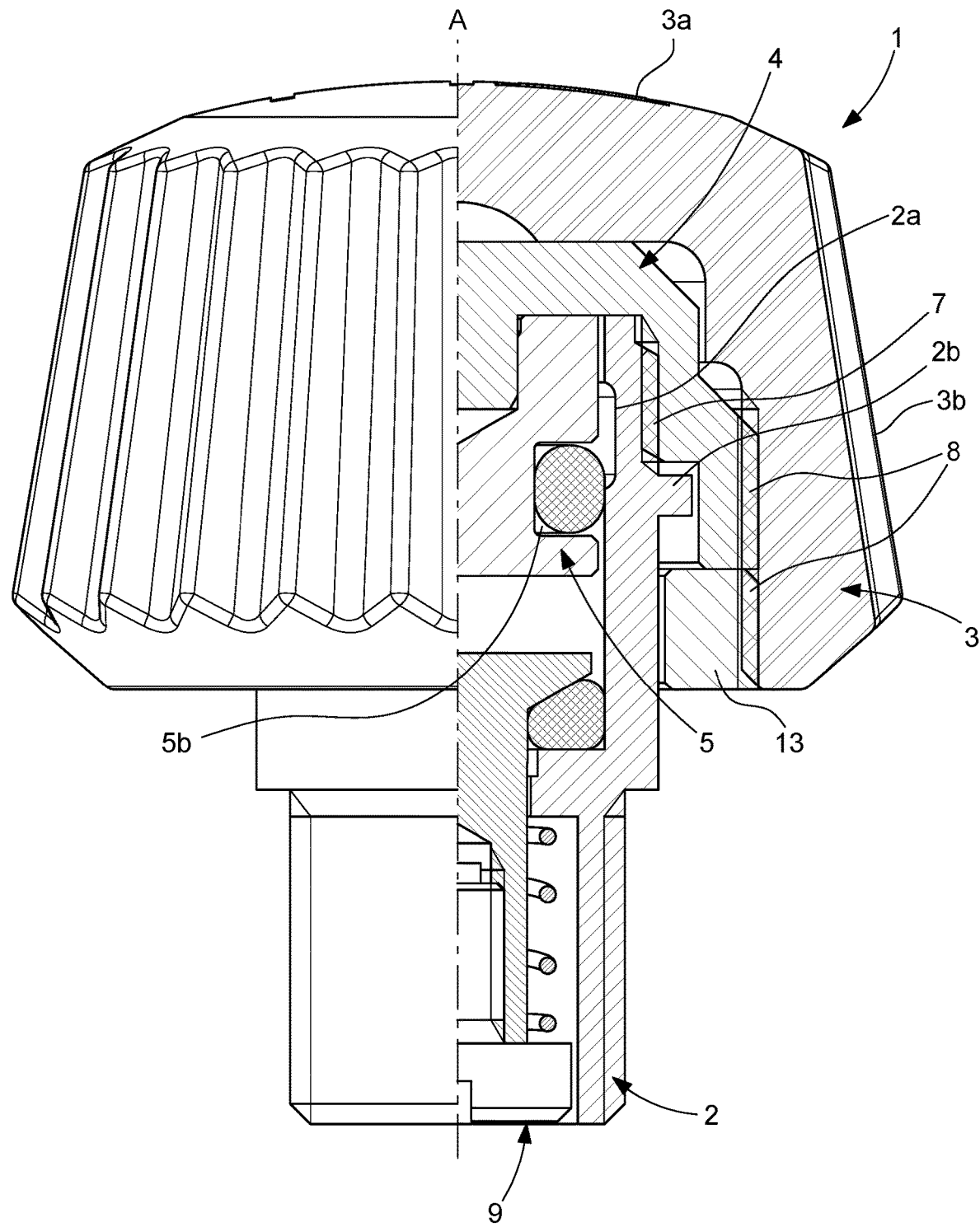
FIG. 1 is a view in half-section of a pressure-relief valve according to the invention in the closed position.
Figure 2:
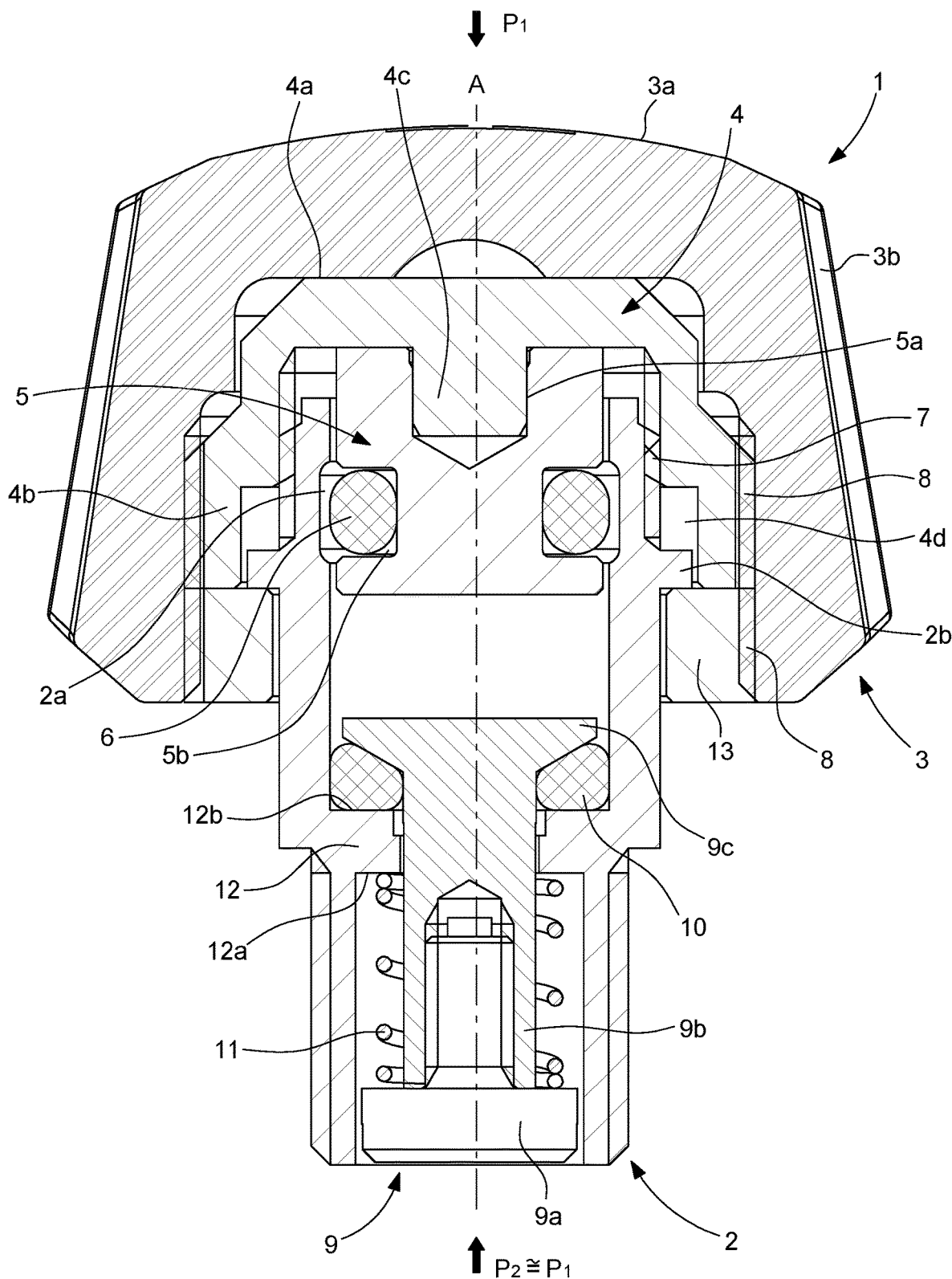
FIG. 2 is a sectional view of this same valve in the open position in the absence of overpressure inside the watch case.
Figure 3:
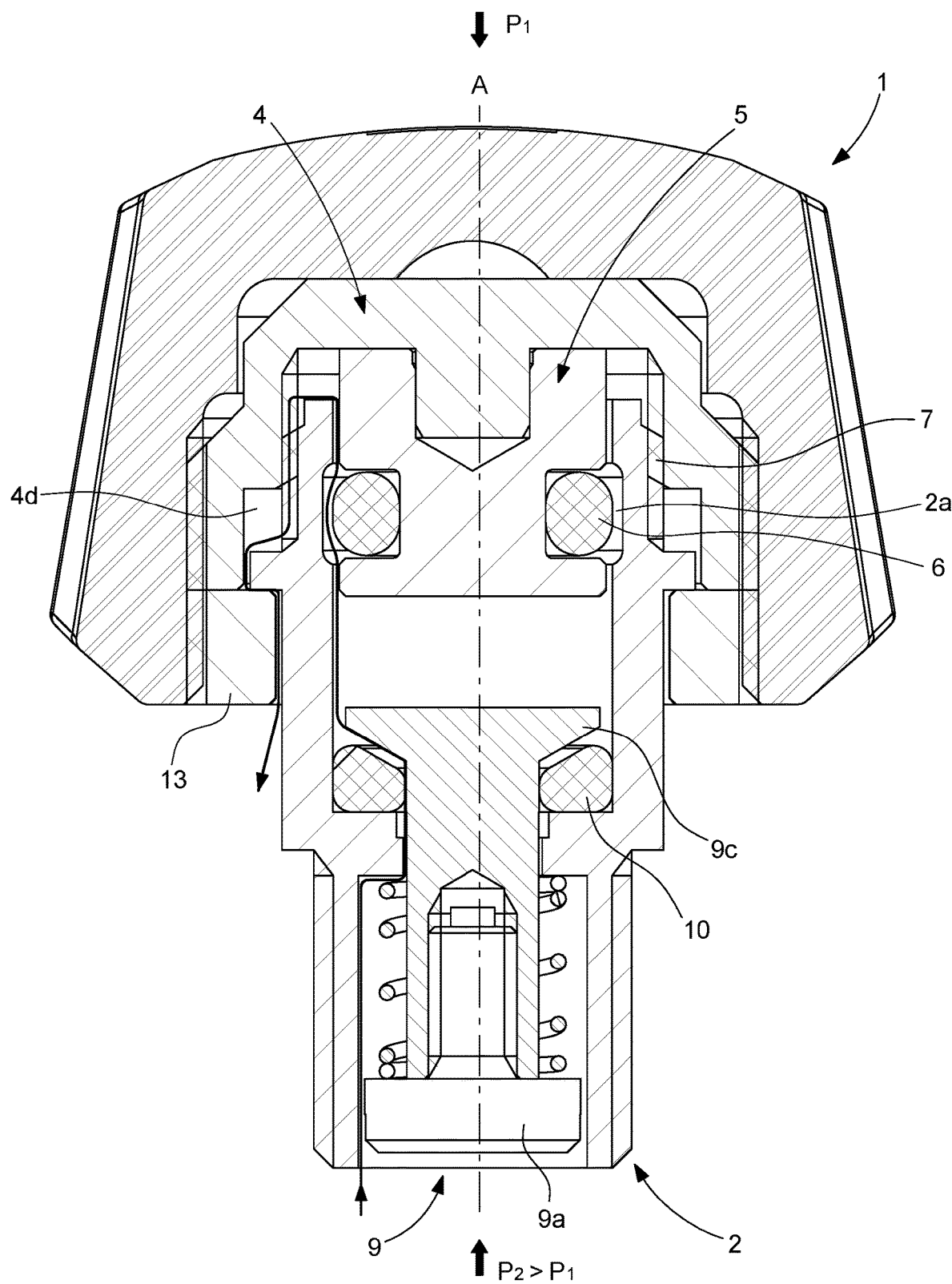
FIG. 3 is a sectional view of this same valve in the open position in the presence of an overpressure inside the watch case.

The valve 1 according to the invention is represented in FIG. 1 in the closed position and in the open position in FIGS. 2 and 3 with an overpressure within the watch case for the latter. The illustrated valve is an automatic valve requiring a manual opening of the valve by unscrewing its head to enable the operation of the valve and therefore the escape of the gas in the event of overpressure inside the watch case it equips.

The valve 1 includes a tube 2 intended to be fastened on the watch case (not represented), a head 3 mounted movable in rotation and in translation respectively about and along the axis A of the tube, which is also the central axis of the valve. This head may be made of a hard material such as ceramic, sapphire, ceramels, etc., of conventionally of materials that are less hard such as steel. By hard material, it should be understood a material having a Vickers hardness higher than 500 HV, preferably higher than 700 HV. The head 3 is recessed with a recess delimited by a first cover 3a extended by a first axial skirt 3b having an axisymmetry around the axis A. According to the invention, the head 3 is secured to at least one insert 4, called first insert, positioned within the recess of the head. Preferably, this first insert 4 also includes a recess delimited by a second cover 4a also extended by a second axial skirt 4b having an axisymmetry around the axis A, said cover 4a being positioned against the internal face of the cover 3a of the head 3 (FIG. 2). The cover 4a includes a central connecting element 4c, in the form of a cylindrical stud in the illustrated example, projecting from the internal face of the cover 4a extending in the direction of the axis A. This first insert 4 is secured to at least one second insert 5. This second insert 5 includes a housing 5a dug in the direction of the axis A, intended to accommodate the central connecting element 4c of the first insert 4. The second insert 5 includes in the external face of its lateral wall an indentation 5b allowing accommodating the first sealing gasket 6 of the valve and intended to cooperate with the internal wall of the tube 2 in the screwed position of the head. This indentation 5b is dug over the entire rim of the lateral wall.

The head 3 is mounted on the tube 2 via the first insert 4 wherein a portion of the internal face of the axial skirt 4b is screwed onto a portion of the external face of the tube 2. These means for fastening by screwing, also called first fastening means, are represented with the reference 7 (FIGS. 1 and 2). According to the invention, the assembly between the head 3 and the first insert 4 is achieved by screwing, preferably by screwing and gluing, or alternatively by simple gluing. A portion of the internal face of the axial skirt 3b of the head 3 is assembled on a portion of the external face of the axial skirt 4b of the first insert 4. The fastening means, also called second fastening means, are represented with the reference 8 (FIGS. 1 and 2). The assembly between the first insert 4 and the second insert 5 is achieved via the central connecting element 4c which, preferably, is fitted into the housing 5a of the second insert 5. Henceforth, the first insert 4 is made of a material tolerating some deformation during fitting such as steel. Typically, this material has a hardness lower than 500 HV.

Conventionally, the valve includes a plunger 9 which is mounted within the tube 2 next to the second insert 5 in a direction opposite to the head. The plunger 9 mounted movable in the direction of the axis A includes a base 9a topped by a stem 9b which flares at its end opposite to the base (FIG. 2). The portion 9c that flares defines a bearing surface of a second sealing gasket 10 of the valve. This plunger moves axially in the direction of the valve head when a pressure higher than a predetermined pressure is applied on its base 9a. A return spring 11 wound around the stem 9b ensures the return of the plunger 6 in the rest position when the pressure P2 applied on the base 6a is lower than a given value which depends on the stiffness of the spring. This spring 11 bears at one end on the base 9a and at the other end on a banking 12 projecting from the internal face of the tube 2. Said banking 12 is defined by a lower face 12a directed towards the base 9a of the plunger and on which the spring 11 bears and by an upper face 12b opposite to said lower face 12a. According to the invention, the second sealing gasket 10 is positioned between this upper face 12b and the flared portion 9c of the stem of the plunger 9.

Besides the shoulder 12 formed on its internal face, the tube 2 includes a notch 2a which extends over the entire rim of this internal face, intended to be positioned opposite the first sealing gasket 6 when the valve is in the open position as shown in FIGS. 2 and 3. In the closed position (FIG. 1), the notch 2a is axially offset with respect to the indentation 5b formed in the second insert 5 possibly with an overlap.

On its external face, the tube 2 includes a collar 2b which is positioned within a recess 4d formed in the internal face of the axial skirt 4b of the first insert 4. This recess 4d opens at the base of the axial skirt 4b and is closed by a ring 13. This ring 13 is disposed within the recessed portion of the head 3 next to the first insert 4 in the direction of the plunger. The ring 13 delimits with the recess 4d of the first insert 4 a housing accommodating the collar 2b. The ring forms a banking which limits the axial movement of the head when the latter is unscrewed to open the valve. This ring is assembled on the axial skirt of the head by screwing (fastening means 8), preferably by screwing and gluing, or alternatively by simple gluing, always in order to avoid an assembly by welding or fitting.

The operation of the valve is as follows. Opening of the valve 1 is controlled by the user by unscrewing the head 3 inducing an axial movement of the head with the collar 2b of the tube 2 abutting against the ring 13 which places the valve in an operating position. In this open position, a space for the passage of the gas is cleared between the first sealing gasket 6 and the notch 2a formed in the tube 2. In the absence of an overpressure inside the watch case (P1=P2 or P2 slightly higher than P1), the second sealing gasket 10 is compressed against the shoulder 12 of the tube 2 by the flared portion 9c of the plunger 9 (FIG. 2). Henceforth, the valve is completely tight. In the presence of an overpressure inside the watch case (P2>P1), the plunger 9 rises, which releases the second sealing gasket 10 and enables the passage of the gas to balance the pressures between the inside and the outside of the case (FIG. 3). This flow path of the gas is schematised in FIG. 3 by the arrows. The passage is performed successively in the space between the plunger 9 and the tube 2, between the second sealing gasket 10 and the flared portion 9c of the plunger and then between the notch 2a of the tube 2 and the first sealing gasket 6. Afterwards, the passage of the gas is performed between the second insert 5 and the tube 2, between the upper end of the tube 2 and the first insert 4, between the first insert 4 and the second insert 5 at the fastening means 7, within the recess 4d of the first insert 4 before finally reaching the outside after a passage between the ring 13 and the tube 2.

NOMENCLATURE

1. Valve
2. Tube
    a. Notch
    b. Collar
3. Head
    a. Cover, also called first cover,
    b. Axial skirt, also called first axial skirt,
4. First insert
    a. Cover, also called second cover,
    b. Axial skirt, also called second axial skirt,
    c. Central connecting element
    d. Recess
5. Second insert
    a. Housing
    b. Indentation
6. First sealing gasket
7. First fastening means
8. Second fastening means
9. Plunger
    a. Base
    b. Stem
    c. Flared portion
10. Second sealing gasket
11. Spring
12. Shoulder of the tube
    a. Lower face
    b. Upper face
13. Ring

The invention claimed is:

1. A pressure-relief valve (1) for a watch case comprising:
a tube (2) intended to be fastened to said watch case, said tube (2) defining an axis A designating an axial direction,
a head (3) mounted movable in rotation and in translation about and along said axis A, said head (3) being able to adopt a first axial position, which is an open position, a configured to allow a gas flow between the inside and the outside of the watch case and a second axial position, which is a closed position, where the gas flow between the inside and the outside of the watch case is prevented, said head (3) being provided with a cover (3a), which is a first cover, and with an axial skirt (3b), which is a first axial skirt, delimiting a recess, which is a first recess, within the head (3),
a first insert (4) mounted within said first recess of the head (3), and
a first sealing gasket (6) arranged in the head (3) and on an inside of the first insert (4) with, in a direction perpendicular to the axis A, the first insert (4) being between the first sealing gasket (6) and the head (3),
wherein the head (3) is mounted on the tube (2) via the first insert (4) and wherein the head (3) is fastened to said first insert (4) by fastening means (8) comprising a screw thread and/or a glue.

2. The pressure-relief valve (1) according to claim 1, wherein the first insert (4) is recessed and includes within its recess, which is a second recess, a second insert (5).

3. The pressure-relief valve (1) according to claim 2, wherein the first insert (4) is provided with a cover (4a), which is a second cover, and with an axial skirt (4b), which is a second axial skirt, delimiting the second recess, said second cover (4a) being positioned against the internal face of the first cover (3a) of the head (3).

4. The pressure-relief valve (1) according to claim 3, wherein the second cover (4a) of the first insert (4) includes a central connecting element (4c) projecting from the internal face of the second cover (4a) according to the axial direction and wherein the second insert (5) includes a housing (5a) accommodating the central connecting element (4c).

5. The pressure-relief valve (1) according to claim 2, wherein the second insert (5) includes in the external face of its lateral wall an indentation (5b) accommodating said first sealing gasket (6).

6. The pressure-relief valve (1) according to claim 5, wherein the tube (2) includes over its internal face a notch (2a) positioned opposite the indentation (5b) when the valve (1) is in the open position and positioned with an axial offset when the valve (1) is in the closed position.

7. The pressure-relief valve (1) according to claim 1, further comprising a second sealing gasket (10), wherein the tube (2) includes over its internal face a shoulder (12) on which the second sealing gasket (10) rests and wherein the valve further includes a plunger (9) mounted movable axially within the tube (2), said plunger (9) including a flared portion (9c) compressing said second sealing gasket (10) against the shoulder (12) when the valve (1) is in the closed position and releasing said second sealing gasket (10) when the valve (1) is in the open position.

8. The pressure-relief valve (1) according to claim 1, further comprising a ring (13) within the first recess of the head (3) next and contiguous to the first insert (4), said ring (13) being fastened to the head (3) with said fastening means (8) comprising the screw thread and/or the glue.

9. The pressure-relief valve (1) according to claim 8, wherein a recess (4d), which is a third recess, is formed in the internal face of the second axial skirt (4b) of the first insert (4), said third recess opening onto the ring (13), and wherein the tube (2) includes on its external face a collar (2b) which is positioned within said third recess (4d), said ring (13) forming a banking which limits the axial movement of the head (3) when it passes from the closed position to the open position.

10. The pressure-relief valve (1) according to claim 1, wherein the head (3) is made of a material having a Vickers hardness higher than 500 HV and comprises any of a ceramic material, sapphire or ceramels.

11. The pressure-relief valve (1) according to claim 1, wherein the first insert (4) is made of a material having a hardness lower than 500 HV.

12. The pressure-relief valve (1) according to claim 1, wherein the head (3) lacks any fitting and welding.

13. A watch comprising a pressure-relief valve (1) for a watch case comprising:
a tube (2) intended to be fastened to said watch case, said tube (2) defining an axis A designating an axial direction,
a head (3) mounted movable in rotation and in translation about and along said axis A, said head (3) being able to adopt a first axial position, which is an open position, and configured to allow a gas flow between the inside and the outside of the watch case and a second axial position, which is a closed position, where the gas flow between the inside and the outside of the watch case is prevented, said head (3) being provided with a cover (3a), which is a first cover, and with an axial skirt (3b), which is a first axial skirt, delimiting a recess, which is a first recess, within the head (3),
a first insert (4) mounted within said first recess of the head (3), and
a first sealing gasket (6) arranged in the head (3) and on an inside of the first insert (4) with, in a direction perpendicular to the axis A, the first insert (4) being between the first sealing gasket (6) and the head (3),
said valve (1) being wherein the head (3) is mounted on the tube (2) via the first insert (4) and wherein the head (3) is fastened to said first insert (4) by fastening means (8) comprising a screw thread and/or a glue.

14. The pressure-relief valve (1) according to claim 11, wherein the head (3) is made of a material having a Vickers hardness higher than 700 HV, and comprises any of a ceramic material, sapphire or ceramels.

15. The pressure-relief valve (1) according to claim 2, wherein the cover (4a) of the first insert (4) is inside of the cover (3a) of the head (3).

16. The pressure-relief valve (1) according to claim 3, wherein the cover (4a) of the first insert (4) and the a central connecting element (4c) of the first insert (4) are both inside of the cover (3a) of the head (3).

17. The pressure-relief valve (1) according to claim 2, wherein the second insert (5) is bilaterally symmetric about the axis A.

18. The pressure-relief valve (1) according to claim 2, wherein, in the direction perpendicular to the axis A, the first sealing gasket (6) is between the second insert (5) and the first insert (4).

19. The pressure-relief valve (1) according to claim 18, wherein, in the direction perpendicular to the axis A, the tube (2) is between the first insert (4) and both of the first sealing gasket (6) and the second insert (5).

20. The pressure-relief valve (1) according to claim 7, wherein
- the first insert (4) is recessed and includes within its recess, which is a second recess, a second insert (5), and
- a face of the second insert (5), along the axis A, is within the tube (2), faces a face of the plunger (9), and is at least as wide, in the direction perpendicular to the axis A, as the face of the plunger (9).

\* \* \* \* \*